United States Patent Office 3,278,524
Patented Oct. 11, 1966

3,278,524
PENICILLINS AND THEIR PRODUCTION
David A. Johnson, Fayetteville, and Elwin J. Richardson, Jr., Kirkville, N.Y., assignors, by mesne assignments, to Beecham Group Limited, Brentford, England, a corporation of Great Britain and Northern Ireland
No Drawing. Filed July 31, 1963, Ser. No. 299,083
8 Claims. (Cl. 260—239.1)

This application is a continuation-in-part of our prior copending applications Serial Numbers 179,456, 179,486 and 179,487, all filed March 13, 1962, and all now abandoned.

This invention relates to a new and more efficient method for the production of penicillins and, more particularly, to the method of their preparation which comprises acylating 6-aminopenicillanic acid with a carboxylic acid chloride in an aqueous reaction mixture at an acidic pH in the presence of a water-immiscible organic solvent.

Among the penicillins produced by the process of the present invention are 2-biphenylylpenicillin and those disclosed in United States Patent 2,996,501 and in British complete specification No. 877,120, published September 13, 1961, in United States application Serial No. 815,287, filed May 25, 1959, by our colleague Lee C. Cheney, and by Perron et al., J. Amer. Chem. Soc. 82, 3934–3938, August 5, 1960. When produced in aqueous media as set forth therein the pH is maintained in the range of 6 to 9, as by the addition of a buffer such as sodium bicarbonate, during the reaction of the acid chloride with the 6-aminopenicillanic acid to form the penicillin. The prior art on the subject of forming amides has taught that neutral or alkaline conditions are to be used. Thus, as taught by Hickinbottom (Reaction of Organic Compounds, Longmans, Green and Co., New York, 1938, pages 262–263), a full mole excess of the amine is used when reaction with the acid chloride takes place in an anhydrous organic solvent. When the reaction is conducted in water in the presence of dilute aqueous alkali as in the Schotten-Baumann technique, Hickinbottom states that, "It is essential that the aqueous solution should remain alkaline throughout the acylation."

It is the object of the present invention to provide an improved process for the preparation of penicillins, particularly with respect to increasing yield and simplifying operations.

Thus, in the general procedure of the prior art for acylating 6-aminopenicillanic acid on a commercial scale, the aqueous solution of 6-aminopenicillanic acid obtained by precursor-free fermentation or enzymatic hydrolysis was first adjusted from its nearly neutral pH to a highly acidic pH, such as pH 2, by the addition of acid. It was then allowed to stand or was extracted with a water-immiscible solvent in order to remove any natural penicillins, including benzylpenicillin, or phenylacetic acid present. Then it was adjusted to the desired reaction pH of 6 to 9, preferably 7, by the addition of large amounts of alkali. During the acylation by the acid chloride, it was necessary to add additional alkali to maintain the pH at about 7. Then at the end of the reaction it was necessary to add large amounts of acid to adjust the mixture to pH 2 so that the penicillin which had been synthesized could be extracted from the aqueous reaction mixture into a water-immiscible solvent and isolated therefrom.

This procedure therefore included the consecutive steps of adjusting the pH of the neutral starting solution first down to pH 2, then up to about pH 7 and maintaining it there, and finally back down to pH 2. It was an object of the invention to simplify operations and reduce costs by eliminating the last two pH adjustments.

This procedure, when used in large-scale operations, also required the continuous, measured addition of alkali during the acylation reaction to maintain the desired reaction pH. It was an object of the present invention to eliminate this costly, laborious step and thus simplify operations.

Finally, the prior procedure when used on a practical, commercial scale required the solubilization of the water-insoluble acid chloride in the aqueous reaction mixture by adding it in the form of a solution in a water-soluble solvent such as acetone. This resulted in higher solvent costs and also in later contamination of the penicillin recovery solvent with acetone, necessitating a costly separation before the recovery solvent could be re-used. It was an object of the present invention to eliminate this costly and troublesome use of a solvent for the acid chloride.

The objectives of the present invention have been achieved by the provision, according to the present invention of a process for the production of a penicillin which comprises mixing 6-aminopenicillanic acid with at least one equivalent of an acid chloride at a highly acidic pH in an aqueous reaction medium comprising an unstable emulsion of water and a water-immiscible, inert organic solvent at a temperature in the range of about 0–50° C., separating the rich organic solvent phase containing the penicillin so-produced and recovering said penicillin therefrom.

More specifically there is provided, according to the present invention, a process for the production of a penicillin which comprises mixing 6-aminopenicillanic acid with about 1.1 to 4.5 equivalents of an acid chloride at about pH 2, e.g. in the range of pH 2 to pH 4, in an aqueous reaction medium comprising an unstable emulsion of water and a water-immiscible organic solvent selected from the group consisting of aliphatic esters and ketones, e.g. methyl isobutyl ketone, (lower)alkyl acetates, at a temperature in the range of about 0–35° C., separating the rich organic solvent phase containing the penicillin so-produced and recovering said penicillin therefrom.

In one preferred embodiment the objectives of the present invention have been achieved by the provision, according to the present invention, of a process for the production of a penicillin as defined below, and preferably an $\alpha$-alkyl-$\alpha$-phenoxymethylpenicillin in which the $\alpha$-alkyl group is methyl, ethyl or isopropyl, which comprises mixing 6-aminopenicillanic acid with at least one equivalent of the corresponding $\alpha$-phenoxyalkanoic acid chloride, and preferably the corresponding $\alpha$-phenoxypropionic, -butyric or -isovaleric acid chloride, at a highly acidic pH in an aqueous reaction medium comprising an unstable emulsion of water and a water-immiscible, inert solvent at a temperature in the range of about 0° to 50° C., separating the rich organic solvent phase containing said penicillin and recovering said penicillin therefrom; and, in its preferred embodiment, a process for the production of a penicillin as defined below, and preferably an $\alpha$-alkyl-$\alpha$-phenoxymethylpenicillin in which the $\alpha$-alkyl group is methyl, ethyl or isopropyl, which comprises mixing 6-aminopenicillanic acid with about 1.1 to 4.5 equivalents of the corresponding $\alpha$-phenoxyalkanoic acid chloride, and preferably the corresponding $\alpha$-phenoxy-propionic, -butyric or -isovaleric acid chloride, at a pH in the range of about 2 to 4 and preferably at about pH 2 in an aqueous reaction medium comprising an unstable emulsion of water and a water-immiscible organic solvent selected from the group consisting of aliphatic esters and ketones, which are preferably methyl isobutyl ketone and (lower)alkyl acetates, at a temperature in the range of about 0° to 50° C., and preferably 0° to 35° C., separating the rich organic solvent phase containing said penicillin and recovering said penicillin therefrom.

In another preferred embodiment the objectives of the present invention have been achieved by the provision, according to the present invention, of a process for the production of a 3,5-disubstituted-4-isoxazolylpenicillin as defined below, and preferably a 5(3)-methyl-3(5)phenyl-4-isoxazolylpenicillin (in which the phenyl group may be substituted at the ortho- or para-position with a chlorine atom), which comprises mixing 6-aminopenicillanic acid with at least one equivalent of the corresponding 3,5-disubstituted-4-isoxazolecarbonyl chloride, and preferably the corresponding 5(3)methyl-3(5)phenyl-4-isoxazolecarbonyl chloride (in which the phenyl group may be substitunted at the ortho- or para-position with a chlorine atom), at a highly acidic pH in an aqueous reaction medium comprising an unstable emulsion of water and a water-immiscible, inert solvent at a temperature in the range of about 10–50° C., separating the rich organic solvent phase containing said penicillin and recovering said penicillin therefrom; and, in its preferred embodiment, a process for the production of a 3,5-disubstituted-4-isoxazolylpenicillin as defined below, and preferably a 5(3)methyl-3(5)phenyl-4-isoxazolylpenicillin (in which the phenyl group may be substituted at the ortho- or para-position with a chlorine atom), which comprises mixing 6-aminopenicillanic acid with about 0.9 to 2.0 equivalents of the corresponding 3,5-disubstituted-4-isoxazolecarbonyl chloride, and preferably the corresponding 5(3)methyl-3(5)phenyl-4-isoxazolecarbonyl chloride (in which the phenyl group may be substituted at the ortho- or para-position with a chlorine atom), at a pH in the range of about 2 to 4 and preferably at about pH 2–3 in an aqueous reaction medium comprising an unstable emulsion of water and a water-immiscible organic solvent selected from the group consisting of aliphatic esters and ketones, which are preferably methyl isobutyl ketone and (lower)alkyl acetates, at a temperature in the range of about 10–50° C., and preferably 20–35° C., separating the rich organic solvent phase containing said penicillin and recovering said penicillin therefrom.

In another preferred embodiment of 2-biphenylylcarbonyl chloride is substituted for the acid chlorides described above to produce 2-biphenylylpenicillin.

The volume of the organic solvent is preferably about one-quarter to one-half the volume of the water in order to reduce its cost and provide a more concentrated solution of the penicillin produced, but this lesser volume is not essential and indeed, in some cases, it is advantageous to use a volume of organic solvent greater than that of the aqueous phase containing the 6-aminopenicillanic acid. Thus, for example, when the aqueous concentration of 6-aminopenicillanic acid is greater than 5 mgm./ml., it is advantageous to use a volume of organic solvent equal to or even double that of the aqueous phase.

In any event, the reaction mixture must be a very vigorously and continuously stirred or agitated mixture of water and the water-immiscible organic solvent, i.e. it must be an unstable emulsion.

Thus one preferred penicillin produced by the process of the present invention is a member selected from the group consisting of an acid having the formula

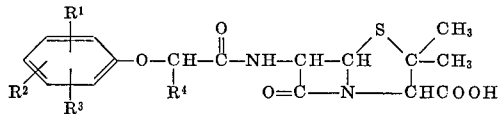

wherein $R^1$, $R^2$ and $R^3$ are each members selected from the group consisting of hydrogen, nitro, acylamino (where the acylating agent is an aliphatic carboxylic acid containing from one to ten carbon atoms inclusive and the substituent may thus also be named (lower)alkanoylamino), (lower)alkyl, chloro, bromo, iodo, (lower)alkoxy, sulfamyl, phenyl, benzyl, cyclohexyl and trifluoromethyl and $R^4$ represents a member selected from the group consisting of (lower)alkyl, phenyl and phenyl (lower)alkyl (including benzyl and α-and β-phenethyl and α-, β- and γ-phenylpropyl) and nontoxic salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabiethylamine, N,N'-bis-dehydroabiethylethylenediamine, N-(lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g. "(lower)alkoxyphenyl," it refers to the alkyl portion of such group which is therefore as described above in connection with "(lower)alkyl." A preferred embodiment of the present invention is the production of the class of compounds having the formula set forth above in which $R^2$ and $R^3$ are hydrogen, $R^1$ is hydrogen or chloro and $R^4$ is (lower)alkyl and preferably methyl, ethyl or isopropyl. Another preferred embodiment is the production of the class of compounds in which $R^2$ and $R^3$ are hydrogen, $R^1$ is hydrogen or chloro and $R^4$ is phenyl.

Thus, the acid chloride used in the process of the present invention has the formula

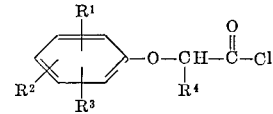

wherein $R^1$, $R^2$, $R^3$ and $R^4$ have the meaning set forth above. The corresponding acid bromide or acid iodide may be used in place of the acid chloride.

The 6-aminopenicillanic acid used in the process of the present invention is prepared as a solid, as an aqueous concentrate or as a constituent of a fermentation broth according to Batchelor et al. (Nature 183, 257–258, January 24, 1959), or Belgian Patent 569,728, or is prepared as a solid or an aqueous solution by enzymatic hydrolysis, e.g. to 6-aminopenicillanic acid and phenylacetic acid or phenoxyacetic acid, of penicillins such as benzylpenicillin and phenoxymethylpenicillin, e.g. according to Rolinson et al. (U.S. Patents 3,014,845 and 3,014,846; Nature 187, 236, 1960), Claridge et al. (Nature 187, 237, 1960), Huang et al. (J. Amer. Chem. Soc. 82, 3790, 1960) and Kaufmann et al. (Naturwissenschaften 47, 474, 1960). It is a particular advantage of the process of the present invention that it can be used to acylate 6-aminopenicillanic acid as that compound is obtained in fermentation broths or enzymatic hydrolysates without purification or concentration. Before using such solutions of 6-aminopenicillanic acid, it is advantageous but not essential to remove solid matter such as mycelia or cells by filtration or centrifugation and to remove or destroy any penicillins present and to remove any acids present (such as phenylacetic acid or phenoxyacetic acid), as by simple extraction at acid pH into an immiscible organic solvent.

When an acid chloride, an acid bromide or an acid anhydride is used in a process of the present invention, it is prepared from the corresponding acid according to the techniques set forth in the literature for acids such as phenylacetic acid and phenoxyacetic acid. In any instances where the substituted α-phenoxyalkanoic acid has not been described, it is prepared from the appropriately substituted phenol and the appropriate α-chloro- or α-bromo-acid by the methods described in the art for phenoxyacetic acid or substituted phenoxyacetic acids or described or referred to in U.S. Patents 2,854,450 and 2,479,297,

PREPARATION OF α-ARYLOXYALKANOIC ACIDS

In the preparation of α-aryloxyalkanoic acids, four different methods have been used: A, B, C and D.

Methods A and B are believed to be general for the preparation of α-aryloxyalkanoic acids from unhindered phenols and α-haloalkanoic acids. The α-bromoalkanoic acids are more frequently used, but the α-chloroalkanoic acids are found to work equally well. Of the two methods, A is to be preferred over B.

When α-halo esters are used instead of α-haloalkanoic acids, and where the phenols are highly hindered, methods C and D should be used. Often the reaction time is shorter and the yields higher when C and D are used for the preparation of unhindered α-aryloxyalkanoic acids from the corresponding α-halo esters. It is interesting to note that in cases of very highly hindered phenols, as in 2,6-diisopropylphenol, method C gives the best result.

No attempt was made to find conditions for optimum yields except in the preparation of α-phenoxypropionic acid, where a better yield is obtained when excess phenol is used (method A).

In the recrystallization of the acids, most of the common organic solvents have been tried. It was found that isopropyl alcohol-water, benzene-lower alkanes (Skelly C or B) work best for most of the acids. One recrystallization from these mixed solvents is usually enough to give a product of analytical purity, provided the starting materials are of good quality. In cases where the acids cannot be crystallized, they are distilled under high vacuum.

The details of these four methods are as follows:

*Method A.*—0.4 mole of phenol (it was found that a better yield was obtained in the preparation of α-phenoxypropionic acid when an excess of phenol was used) and 0.2 mole of an α-haloalkanoic acid were dissolved together in 90 ml. ethanol and an ice-cooled solution of 0.5 mole sodium hydroxide in 30 ml. water was carefully added. The mixture was then heated under reflux on a steam bath for 22 hours.

The ethanol was completely removed under reduced pressure. The residue was transferred to an Erlenmeyer flask containing 200 ml. of water, and dilute hydrochloric acid was added until the solution was strongly acid (pH 2). The precipitated acid was then taken up in ether and extracted with a 5% sodium bicarbonate solution, which was then heated gently on a steam bath under reduced pressure to remove the dissolved ether. On acidification with dilute hydrochloric acid in excess, the phenoxy-acid was obtained as a crystalline precipitate. The yield of the crude acid was usually 50–85% of the theoretical value. One recrystallization from an appropriate solvent usually gave a product of analytical purity.

*Method B.*—To 0.5 mole of an α-haloalkanoic acid was added slowly in an ice bath 0.5 mole sodium hydroxide in 125 ml. H₂O.

A phenol (0.5 mole) was dissolved in a cooled solution of 0.5 mole sodium hydroxide in 125 ml. H₂O. To this sodium phenolate solution was added all at once the aqueous solution of the acid salt and the mixture was heated on a steam bath for 20 hours. The solution was cooled to room temperature, strongly acidified with dilute hydrochloric acid, cooled in an ice bath for an hour and the precipitated oily acid was dissolved in ether. The ether layer was separated and extracted with a 5% sodium bicarbonate solution, acidified with an excess of dilute hydrochloric acid, and the crystalline precipitate was collected by suction. One recrystallization from an appropriate solvent would usually give a product of analytical purity.

*Method C.*—Into a 1-liter 3-necked equipped with a mechanical stirrer, a reflux condenser above a Dean-Stark water trap, and a dropping funnel were placed 0.2 mole of a phenol, 250 ml. of toluene and 0.25 mole of flake sodium hydroxide (Mallinckrodt). The stirred mixture was heated to boiling and maintained under reflux until 3.6 ml. of water (theory 3.6 ml.) had collected in the trap. Ethyl α-haloalkanoate (0.025 mole) was then added dropwise at such a rate that the reaction was maintained under moderate reflux. The mixture was then boiled overnight under reflux.

The mixture was cooled below 10° C. and 40 ml. of methanol and a solution of 0.3 mole of sodium hydroxide in 50 ml. of water were added consecutively. To complete the saponification, the stirred mixture was heated under vigorous reflux for two hours. The hot alkaline mixture was then diluted by the addition of 250 ml. of water. The alkaline aqueous layer was separated and strongly acidified with dilute sulfuric acid. The precipitated oily acid was caused to crystallize by chilling in an ice bath while stirring the mixture with a glass rod. The product was collected by suction and washed with 50 ml. of cold water. One recrystallization from an appropriate solvent was usually enough to afford a product of analytical purity, provided the starting materials were of good quality.

*Method D.*—A solution of 0.156 mole of sodium, 0.156 mole of ethyl α-haloalkanoate and 0.156 mole of a phenol in 120 ml. absolute ethanol was refluxed for four hours. Then 120 ml. of a two normal sodium hydroxide solution was added and the reflux was continued for another hour. The ethanol was distilled off and the residue acidified with dilute hydrochloric acid. An oil separated which soon solidified. The crude acid was taken up in ether and extracted with a 5% sodium bicarbonate solution. The sodium bicarbonate layer was separated and strongly acidified (pH 2) with dilute hydrochloric acid. The precipitated acid was collected by suction and washed with 50 ml. of cold water. Usually one recrystallization was enough to give product of analytical purity provided the starting materials are of good quality.

In the table below are listed numerous examples of α-aryloxyalkanoic acids prepared by one or more of these methods.

| Compound | Method | M.P. or B.P. in °C. | Yield, percent | Reference |
|---|---|---|---|---|
| 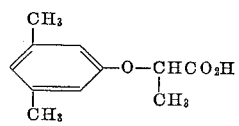 | B | 118–119 | 41 | Harvill, Zimmerman, Hitchcock; Contrib. Boyce, Thompson Inst. 13, 273–80 (1944); C.A. 48, 4009⁸. |
| 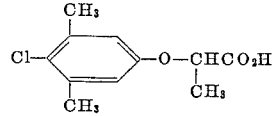 | B | 136–138 | 37 | Synerholm and Zimmerman; Contrib. Boyce, Thompson Inst., 14, 91–103 (1945); C.A. 40, 14743. |
| 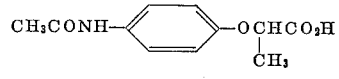 | B | 176–177 | 67 | |

| Compound | Method | M.P. or B.P. in °C. | Yield, percent | Reference |
|---|---|---|---|---|
| [structure: 2-allylphenyl OCH(CH₃)CO₂H] | B | | | |
| [structure: 3-CF₃-phenyl OCH(CH₃)CO₂H] | B | (101–105/0.15 m.m.). | | |
| [structure: phenyl O-CH(CH₂CH₃)CO₂H] | B<br>C | 114.5–116 | 31<br>85 | |
| [structure: phenyl O-CH(CH(CH₃)₂)CO₂H] | D | 72–73 | 25 | |
| [structure: CH₃O-C₆H₄-CO-C₆H₄ with OCH(CH₃)CO₂H] | C | 130–131.5 | 31 | |
| [structure: 4-Cl-phenyl OCH(CH₂C₆H₅)CO₂H] | C | 115–116 | 46 | |
| [structure: 1-naphthyl OCH(CH₃)CO₂H] | C | 148–149 | 40 | Fawett, Osborne, Dain and Walker; Ann. Appl. Biol., 40, 231–43 (1953), cf. C.A. 45, 10316f. |
| [structure: phenyl-S-phenyl OCH(CH₃)CO₂H] | C<br>A | 125.5–126<br>125–126 | 52<br>63 | |
| [structure: 4-tert-amyl phenyl OCH(CH₃)CO₂H] | C | (170–173°/1–15 m.m.). | 33 | |
| [structure: HO-phenyl-OCH(CH₃)CO₂H] | C, D | | | H. Sobotka and J. Austin; J. Am. Chem. Soc. 74, 3813, (1952). |
| [structure: pentachlorophenyl OCH(CH₃)CO₂H] | C | 173.5–174.5 | 60 | |
| [structure: 2,6-dimethoxyphenyl OCH(CH₃)CO₂H] | C | (156–158°/0.3 m.m.). | 36 | |
| [structure: C₆H₅-phenyl-Cl OCH(CH₃)CO₂H] | C | 145–146 | 61 | |
| [structure: 2,6-diisopropylphenyl OCH(CH₃)CO₂H] | C | (129–132°/0.15 m.m.). | 38 | |
| [structure: O₂N-phenyl-O-CH(CH₃)CO₂H] | C<br>B | 139–140.5<br>140–141 | 19<br>21 | |
| [structure: O₂N-(CF₃)-phenyl OCH(CH₃)CO₂H] | C<br>A | 90–92<br>90–91.5 | 21<br>60 | |

| Compound | Method | M.P. or B.P. in ° C. | Yield, percent | Reference |
|---|---|---|---|---|
| ⟨phenyl⟩—OCHCO$_2$H, CH$_3$ | A | 116–116.5 | 80 | A. Fredga and M. Matell, Arkiv. Kemi. 3 (nr. 20), 325 (1951). |
| Cl—⟨phenyl⟩—OCHCO$_2$H, CH$_3$ | A | 115–116 | 54 | Fawett, Osborne, Wain and Walker; Ann. Appli. Biol. 40, 231-43 (1953). |
| ⟨phenyl⟩—OCHCO$_2$H, CH$_2$CH$_3$ | A | 82–83 | 69 | Fawett, Osborne, Wain and Walker; Ann. Appli. Biol.; 40, 231-43, (1953). |
| CH$_3$O—⟨phenyl⟩—OCHCO$_2$H, CH$_3$ | B | 92–93 | 63 | H. Sobotka and J. Austin; J. Am. Chem. Soc., 74, 3813 (1953). |

Another preferred penicillin produced by the process of the present invention is a member selected from the group consisting of an acid having the formula

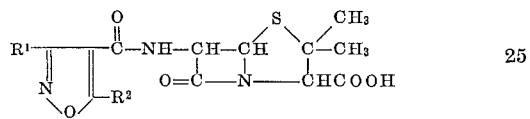

wherein R$^1$ and R$^2$ each represent a member selected from the group consisting of (lower)alkyl, (lower)alkylthio, cyclohexyl, cyclopentyl, cycloheptyl, aralkyl (including benzyl, α- and β-phenethyl, styryl and α- and β- and γ-phenylpropyl, etc.), aryl [including phenyl, chlorophenyl, bromophenyl, (lower)alkylphenyl, (lower)alkoxyphenyl, etc.] and aralkylthio; and nontoxic salts thereof, including nontoxic metallic salts such as sodium, potassium, calcium and aluminum, the ammonia salt and substituted ammonium salts, e.g., salts of such nontoxic amines as trialkylamines, including triethylamine, procaine, dibenzylamine, N - benzylbeta - phenethylamine, 1 - ephenamine, N,N' - dibenzylethylenediamine, dehydroabiethylamine, N,N'-bis-dehydroabietylethylenediamine, N-(lower)alkylpiperidines, e.g., N-ethylpiperadine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxyphenyl," it refers to the alkyl portion of such group which is therefore as described above in connection with "(lower)alkyl." The term "aryl" as used herein refers to the phenyl radical per se and to substituted phenyl radicals of the formula

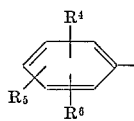

wherein R$^4$, R$^5$ and R$^6$ each represent a member selected from the group consisting of hydrogen, fluoro, chloro, bromo, iodo, trifluoromethyl, (lower)alkyl, (lower)alkoxy, nitro, methylsulfonyl, cyano, di(lower)alkylamino and methylmercapto. A preferred embodiment of the present invention is the production of the class of compounds having the formula set forth above in which one of the groups R$^1$ and R$^2$ is an unsubstituted phenyl group or a substituted phenyl group, preferably chlorophenyl, and the other is a lower alkyl group. Another preferred embodiment is the production of the class of compounds in which R$^1$ and R$^2$ are lower alkyl groups.

Thus, the acid chloride used in the process of the present invention has the formula

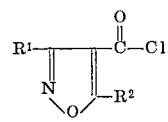

wherein R$^1$ and R$^2$ have the meaning set forth above. The corresponding acid bromide or acid iodide may be used in place of the acid chloride.

In conducting the process of the present invention, the pH of the activation reaction is maintained in the desired highly acidic range by the addition during the reaction of alkali when necessary. Generally, such addition of alkali is necessary when using pure aqueous solutions of 6-aminopenicillanic acid or enzymatic hydrolysates but is not needed when using a precursor-free penicillin fermentation broth.

In a preferred embodiment of the present invention, the process is carried out by simultaneously mixing α-phenoxypropionyl chloride, methyl isobutyl ketone and pH 2, filtered precursor-free penicillin fermentation broth to give very rapid reaction, e.g. on the order of five minutes, and then discharging the activated emulsion containing the product to centrifuges for separation of the solvent phase containing phenethicillin.

In the process of the present invention an inert solvent is defined as one which does not react chemically below 50° C. with the acid chlorides, bromides or iodides used, nor with 6-aminopenicillanic acid nor with the penicillins produced in the reaction, as determined by simple test.

Vastly inferior yields of the desired product as an isolated solid are obtained when the solvent is not present during the activation step.

In its broadest aspect the present invention includes the use of any carboxylic acid chloride which reacts faster with 6-aminopenicillanic acid than it does with water as determined by simple test.

The following examples will serve to illustrate further the process of the invention.

COMPARISON EXAMPLE

In comparing the yields of α-phenoxyethylpenicillin obtained by acylating 6-aminopenicillanic acid containing filtered, precursor-free fermentation broths (held at pH 2 for 30 minutes prior to activation to destroy natural penicillins) with α-phenoxypropionic acid chloride at pH 7 or pH 8 and at room temperature (20 to 25° C.) or at 0 to 5° C. and at molar ratios of acid chloride to 6-APA of 1.25, 2.5 and 5.0, it was found that the optimum conditions were pH 7–7.5, 20–25° C. and a molar ratio of 5.0.

In the above work the pH was maintained during the reaction by the addition of caustic. In additional runs, a molar ratio of 4.2 was far superior to molar ratios of 2.2 and 0.96 and a molar ratio of 5.4 was twice as productive as a molar ratio of 9.1. In additional runs, the maximum productivities were obtained at molar ratios of 3.0, 3.6, 4.3 and 4.0.

*Example 1*

To filtered, precursor-free penicillin fermentation broth containing the indicated amount of 6-aminopenicillanic acid (6-APA) there was added one-half volume of methyl isobutyl ketone and the mixture was vigorously stirred and acidified to pH 2. There was then added at room temperature (20–25° C.) and in one portion an amount of α-phenoxypropionic acid chloride (PPC) sufficient to give the indicated molar ratio of acid chloride to 6-APA. The pH remained at 2 without additional adjustment.

After stirring the reaction mixture for thirty minutes the methyl isobutyl ketone phase containing the product, α-phenoxyethylpenicillin, was separated and the product was precipitated directly therefrom as the potassium salt by the addition of about one-twentieth volume of concentrated aqueous potassium acetate (pH 8.2–8.7; specific gravity 1.32–1.34 at 20° C.).

The results were as follows:

| Broth No. | 6-APA Potency, Mcg./Ml. | Molar Ratio PPC:6-APA | Yield, percent |
|---|---|---|---|
| 1 | 505 | 3.0 | 76 |
| 1 | 505 | 4.5 | 87 |
| 1 | 505 | 6.0 | 73 |
| 2 | 620 | 2.4 | 78 |
| 2 | 620 | 3.6 | 85 |
| 2 | 620 | 4.8 | 83 |
| 3 | 810 | 1.9 | 43 |
| 3 | 810 | 2.8 | 62 |

Omission of the methyl isobutyl ketone from the above procedure was found to reduce the yields by approximately 75%. Use of butyl acetate in place of methyl isobutyl ketone gave equally good results.

In twenty-five comparable experiments in which the reaction pH was maintained at 7.5 and in which the molar ratios varied from 2.0–5.5, the average yield of isolated, solid product was 61%.

*Example 2*

The pH 2 methyl isobutyl ketone emulsion procedure of Example 1 was carried out on one liter samples of a single broth at varying molar ratios of α-phenoxypropionyl chloride to 6-aminopenicillanic acid to give the following yields of isolated, solid potassium α-phenoxyethylpenicillin:

| Molar Ratio, PCC:6-APA: | Product Yield in g. |
|---|---|
| 1.0 | .83 |
| 1.5 | .87 |
| 2.0 | .87 |
| 2.5 | 1.03 |
| 3.5 | 1.04 |
| 4.5 | 1.02 |
| 6.0 | .99 |

*Example 3*

The pH 2 methyl isobutyl ketone emulsion procedure of Example 1 was carried out on one liter samples of crystalline 6-aminopenicillanic acid dissolved in pure water. Varying molar ratios of α-phenoxypropionyl chlorides to 6-aminopenicillanic acid gave the following yields of isolated, solid potassium α-phenoxyethylpenicillin:

| Molar ratio, PPC:6-APA: | Product yield in g. |
|---|---|
| 1.2 | 1.12 |
| 1.6 | 1.19 |
| 2.0 | 1.34 |
| 2.5 | 1.41 |
| 3.3 | 1.38 |

*Example 4*

In the procedure of Example 1 it was found that the yield of isolated, solid product was not altered by varying the addition procedures as follows:

(a) The α-phenoxypropionyl chloride was added to wet methyl isobutyl ketone in 15 seconds, the mixture was stirred 15 seconds and then the broth was added;

(b) The α-phenoxypropionyl chloride was added to one-quarter of the methyl isobutyl ketone over 15 seconds, the mixture was stirred 15 seconds, all the broth was added, the mixture was stirred one minute and then the remainder of the methyl isobutyl ketone was added.

*Example 5*

It was found that in the pH 2 methyl isobutyl ketone emulsion procedure of Example 1, molar ratios of PPC:6-APA of 1.85 to 3.0 were equally effective and so were one-half and one-quarter volumes of methyl isobutyl ketone as compared to the broth. The reduction in yield was 16% and 25% respectively when the ratio of the volume of methyl isobutyl ketone to water was changed from 1:2 to 1:6 and 1:12, respectively.

The compounds prepared by the process of the present invention may be viewed, broadly speaking, as the result of combining the single, naturally occurring optical isomer, 6-aminopenicillanic acid, with an acid which contains at least one asymmetric carbon atom as indicated by the asterisk, thus:

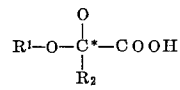

Thus, the product (amide or penicillin) when a racemic acid is used will be a mixture of two diastereoisomers. Both are biologically active and both of these isomers and mixtures thereof are included within the scope of the present invention. As illustrated above, the individual isomers are prepared in pure form by starting with the pure dextro or levo form of the acid or by physical separation of the mixture produced from the racemic acid.

*Example 6*

A broth containing 6-aminopenicillanic acid was prepared by conducting a penicillin fermentation without the usual addition of a precursor such as phenylacetic acid and was filtered at neutral pH. The filtrate was adjusted to pH 2 with mineral acid, decolorized by adding 0.5% of its weight of activated carbon and filtered. One liter of this filtrate was heated to 35° C. and stirred vigorously with 500 ml. methyl isobutyl ketone. For each mole of 6-aminopenicillanic acid present there was then added two moles of 5-methyl-3-phenyl-4-isoxazolecarbonyl chloride with stirring. The pH remained at 2 without any addition of sodium hydroxide. After maintaining the reaction or "activation" mixture at 35° C. for one hour, the emulsion was filtered. The methyl isobutyl ketone containing the product, 5-methyl-3-phenyl-4-isoxazolylpenicillin, was separated and extracted at room temperature with 350 ml. of approximately 1.5% $NaHCO_3$ buffer for ten minutes at pH 7–8. The rich bicarbonate buffer containing the product as its sodium salt was separated and extracted at room temperature with 200 ml. methyl isobutyl ketone at pH 2 for five minutes.

The rich methyl isobutyl ketone containing the product was separated and centrifuged to remove undissolved water and to it was added approximately two moles of sodium 2-ethylhexanoate (as a 22% solution in dry methyl isobutyl ketone). During standing for two hours at room temperature, the desired product; sodium 5-methyl-3-phenyl-4-isoxazolylpenicillin monohydrate, precipitated in crystalline form and was collected by filtration and washed with methyl isobutyl ketone and then with acetone.

The foregoing procedure was repeated with various alterations. Thus, the methyl isobutyl ketone was replaced by ethyl acetate. Typical filtered broths used as starting materials contained 1300–2110 mcg./ml. 6-aminopenicillanic acid. The ratio of solvent volume to broth volume was varied from 1.0 to 0.25. The reaction temperature was varied from 25–35° C. The molar ratio of acid chloride to 6-aminopenicillanic acid was varied from 1.5 to 4.7. The molar ratio of sodium 2-ethylhexanoate to acid chloride was varied from 0.8 to 2.4. In each of the foregoing procedures a solid product of high purity was obtained in 55 to 80% yield by the use of any conditions within the above ranges.

*Example 7*

Aqueous solutions containing 10,000 mcg./ml. crystalline 6-aminopenicillanic acid were adjusted to pH 2 with mineral acid and covered with 0.25 to 1.0 volume of ethyl acetate or methyl isobutyl ketone. For each mole of 6-aminopenicillanic acid present there was then added 1.2 to 2.0 moles 5-methyl-3-phenyl-4-isoxazolecarbonyl chloride with stirring. The pH was maintained at 2 by the addition of sodium hydroxide. After maintaining the reaction mixture at 25 or 35° C. for one hour, the emulsion was filtered. The organic solvent phase was separated and centrifuged to remove water and to it there was added about 2 moles of sodium 2-ethylhexanoate dissolved in the same solvent at a concentration of about 22%. The desired product, sodium 5-methyl-3-phenyl-4-isoxazolylpenicillin monohydrate, precipitated in crystalline form and high purity in yields of from 75 to 97%.

The specific conditions and results were as follows:

| Activation Solvent | Ratio Solvent: $H_2O$ | Temp., °C. | Molar Ratio Acid Cl: 6-APA | Weight Yield in Percent |
| --- | --- | --- | --- | --- |
| Ethyl Acetate | 0.5 | 35 | 1.2 | 79 |
| Do | 0.5 | 35 | 2.0 | 93.5 |
| MIBK | 0.5 | 35 | 1.2 | 75 |
| MIBK | 0.5 | 35 | 2.0 | 83 |
| Ethyl Acetate | 0.25 | 35 | 1.3 | 79 |
| MIBK | 0.25 | 35 | 1.3 | 79 |
| MIBK | 0.5 | 35 | 1.3 | 79 |
| Ethyl Acetate | 0.5 | 35 | 2.0 | 97.5 |
| MIBK | 0.25 | 25 | 1.5 | 88 |
| MIBK | 0.5 | 25 | 1.5 | 89 |
| MIBK | 1.0 | 25 | 1.5 | 97 |

When the pH during activation was maintained at 7, the yield was only 56% as compared to 88% for the control run at pH 2.

*Example 8*

Aqueous solutions containing 10,700 to 13,000 mcg./ml. 6-aminopenicillanic acid were prepared by enzymatic hydrolysis of benzylpenicillin, adjusted to pH 2 with mineral acid and covered with 0.25 to 0.50 volume of ethyl acetate or methyl isobutyl ketone. For each mole of 6-aminopenicillanic acid present there was then added 0.92 to 1.54 moles 5-methyl-3-phenyl-4-isoxazolecarbonyl chloride with stirring. The pH was maintained at 2 by the addition of sodium hydroxide. After maintaining the reaction mixture at 25 or 35° C. for one or two hours, the product, sodium 5-methyl-3-phenyl-4-isoxazolylpenicillin monohydrate, was isolated as a crystalline solid of high purity by either the long or the short method described above in Examples 6 and 7 respectively in yields of 56 to 86%.

In the preferred procedure for large-scale work, use is made of 17 liters methyl isobutyl ketone for every 45 liters of 6-amonopenicillanic acid solution containing about 10,000 mcg./ml., of 1.25 moles acid chloride per mole of 6-aminopenicillanic acid, of 1.4 moles sodium 2-ethylhexanoate per mole of 6-aminopenicillanic acid and of a reaction or activation pH of 2.7–3.0.

*Example 9*

Substitution for the 5-methyl-3-phenyl-4-isoxazolecarbonyl chloride in the procedures of Examples 6, 7 and 8 above of an equimolar weight of
5-methyl-3-(2'-chlorophenyl)-4-isoxazolecarbonyl chloride,
5-methyl-3-(4'-chlorophenyl)-4-isoxazolecarbonyl chloride,
3-methyl-5-(2'-chlorophenyl)-4-isoxazolecarbonyl chloride,
3-methyl-5-(4'-chlorophenyl)-4-isoxazolecarbonyl chloride, and
3-methyl-5-phenyl-4-isoxazolecarbonyl chloride, respectively, produces yields of
5-methyl-3-(2'-chlorophenyl)-4-isoxazolylpenicillin,
5-methyl-3-(4'-chlorophenyl)-4-isoxazolylpenicillin,
3-methyl-5-(2'-chlorophenyl)-4-isoxazolylpenicillin,
3-methyl-5-(4'-chlorophenyl)-4-isoxazolylpenicillin, and
3 - methyl-5-phenyl-4-isoxazolylpenicillin, respectively, in yields superior to those obtained when the activation is carried out at a pH in the range of 6 to 9.

*Example 10*

To a vigorously-stirred, aqueous solution at room temperature (23–28° C.) of 10,000 mcg./ml. of 6-aminopenicillanic acid (10.8 g. in 1 liter $H_2O$) adjusted to pH 3.0 to 3.3, there was added first 400 ml. methyl isobutyl ketone and then in one portion a solution of 3-(o-chlorophenyl)-5-methyl-4-isoxazolecarbonyl chloride (1.3 moles per mole of 6-aminopenicillanic acid) in 100 ml. methyl isobutyl ketone. The pH was maintained at 3.0 to 3.3 by the addition to the emulsified reaction mixture of 20% aqueous NaOH during the next hours; very little addition of caustic was required after the first thirty minutes, which indicated that the activation reaction was virtually complete in the first half-hour. The pH was then adjusted to 2 by the addition of mineral acid and the methyl isobutyl ketone containing the product, 3-(o-chlorophenyl)-5-methyl-4-isoxazolylpenicillin, was separated, clarified with 2 g. activated charcoal and filtered. The addition, as in Example 6, of sodium 2-ethylhexanoate in dry methyl isobutyl ketone to this methyl isobutyl ketone solution of the product precipitated a yield greater than 85% of theory of the sodium salt of the product as a solid of high purity.

*Example 11*

A. PREPARATION OF 2-BIPHENYLCARBONYL CHLORIDE

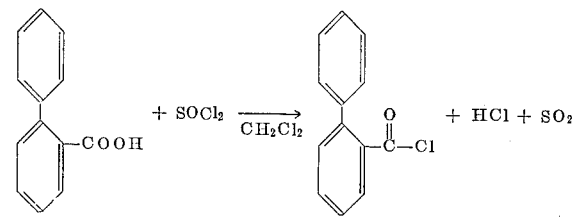

2-biphenylcarboylic acid (1000 g., 5.04 moles) was dissolved in 5 liters dry methylene chloride and 20 ml. dimethylformamide was added as a catalyst. There was then added 400 ml. (5.51 moles) redistilled thionyl chloride. The reaction was heated barely to reflux for 30 minutes and then placed under moderate reflux for 30–45 minutes to expel $SO_2$ and HCl. The methylene chloride is then removed by distillation in vacuo below 55° C., avoiding exposure to polyvalent metal ions, to leave as the residue the desired 2-biphenylcarbonyl chloride.

B. PREPARATION OF 2-BIPHENYLYLPENICILLIN

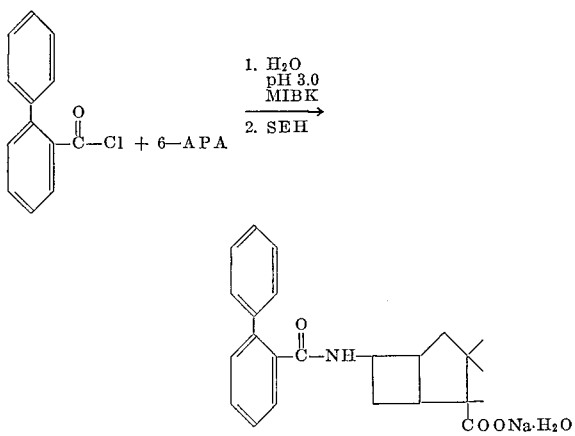

6-aminopenicillanic acid (6-APA; 1000 g., 4.62 moles) was slurried in 100 liters water and then dissolved by slowly adjusting the pH to 6.0–6.5 with NaOH. The pH of the solution was then adjusted to 3.0 by adding 20% H₂SO₄ and then 40 liters methyl isobutyl ketone (MIBK) was added. To this mixture there was then added 2-biphenylcarbonyl chloride (2003 g., 9.24 moles) in 5 liters dry methyl isobutyl ketone. There was also added an additional 5 liters dry MIBK used as a rinse to complete the transfer of the acid chloride.

The reaction mixture was maintained at about 25–28° C. and stirred vigorously for 90 minutes while continuously maintaining the pH at about 3.0 by the addition of NaOH.

The reaction mixture was then chilled below 10° C., adjusted to pH 2.0 with H₂SO₄ and stirred ten minutes. The organic solvent phase was separated and set aside. The aqueous phase was re-extracted with 10 liters MIBK and the two batches of the solvent phase containing the desired product, 2-biphenylylpenicillin, were combined, stirred 10 minutes at less than 10° C. with 550 g. activated charcoal (Darco KB), filtered and combined with 10 liters dry MIBK used to wash the filter-cake. To this combined and stirred MIBK solvent phase there was rapidly added 11.6 liters of a 22% solution in dry MIBK of sodium 2-ethylhexanoate (SEH). The resulting solution was seeded and stirred for one hour, precipitating sodium 2-biphenylylpenicillin monohydrate. The slurry was chilled for one hour and collected by filtration, using first 20 liters dry MIBK and then 30 liters dry acetone to wash the filtercake. The crystalline product was then dried at 45–50° C. and found to have been obtained in 87–93% yield.

Considerably lower yields are obtained by conducting the activation at pH 6 to 9.

While various embodiments have been described in some detail it will be understood that modifications can be made in the procedures described without departing from the scope of the invention. Certain agents, compounds, or mixtures (e.g. acids, bases, solvents and the like), and other details described or equivalent to those described in relation to one procedure may be employed in connection with other procedures. For example the use of purer solutions of 6-aminopenicillanic acid such as those obtained by enzymatic hydrolysis as opposed to those obtained by direct fermentation permits the preferred range of equivalents of the acid chloride to be reduced to about 1.1–1.2 and the preferred temperature of the reaction to be reduced to the range of about 0–5° C. for maximum yields.

We claim:

1. A process for the production of a penicillin which comprises mixing 6-aminopenicillanic acid with at least one equivalent of a carboxylic acid chloride at a highly acidic pH in the range of pH 2 to 4 in an aqueous reaction medium comprising an unstable emulsion of water and a water-immiscible, inert organic solvent at a temperature in the range of about 0–50° C., separating the rich organic solvent phase containing the pencillin so-produced and recovering said penicillin therefrom.

2. A process for the production of a pencillin which comprises mixing 6-aminopenicillanic acid with about 1.1 to 4.5 equivalents of a carboxylic acid chloride at about pH 2 in an aqueous reaction medium comprising an unstable emulsion of water and a water-immiscible organic solvent selected from the group consisting of methyl isobutyl ketone and (lower)alkyl acetates at a temperature in the range of about 0–35° C., separating the rich organic solvent phase containing the penicillin so-produced and recovering said penicillin therefrom.

3. A process for the production of a penicillin selected from the group consisting of an acid having the formula

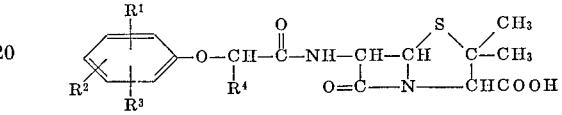

wherein $R^1$, $R^2$ and $R^3$ are each members selected from the group consisting of hydrogen, nitro, (lower)alkanoylamino, (lower)alkyl, chloro, bromo, iodo, (lower)alkoxy, sulfamyl, phenyl, benzyl, cyclohexyl and trifluoromethyl and $R^4$ is a member selected from the group consisting of (lower)alkyl, phenyl and phenyl(lower)alkyl, which comprises mixing 6-aminopenicillanic acid with at least one equivalent of an acid chloride having the formula

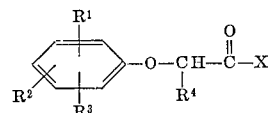

wherein $R^1$, $R^2$, $R^3$ and $R^4$ have the meaning set forth above and X is a member selected from the group consisting of chloro, bromo and iodo, at a highly acidic pH in the range of pH 2 to 4 in an aqueous reaction medium comprising an unstable emulsion of water and a water-immiscible, inert organic solvent at a temperature in the range of about 0° to 50° C., separating the rich organic solvent phase containing said penicillin and recovering said penicillin therefrom.

4. A process for the production of a penicillin selected from the group consisting of an acid having the formula

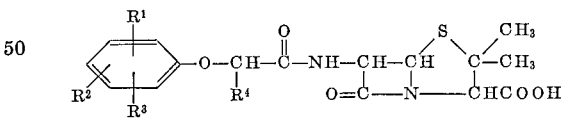

wherein $R^1$, $R^2$ and $R^3$ are each members selected from the group consisting of hydrogen, nitro, (lower)alkanoylamino, (lower)alkyl, chloro, bromo, iodo, (lower)alkoxy, sulfamyl, phenyl, benzyl, cyclohexyl and trifluoromethyl and $R^4$ is a member selected from the group consisting of (lower)alkyl, phenyl and phenyl(lower)alkyl, which comprises mixing 6-aminopenicillanic acid with about 1.1 to 4.5 equivalents of an acid chloride having the formula

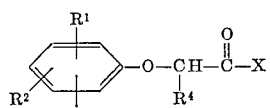

wherein $R^1$, $R^2$, $R^3$ and $R^4$ have the meaning set forth above and X is a member selected from the group consisting of chloro, bromo and iodo, at about pH 2 in an aqueous reaction medium comprising an unstable emulsion of water and a water-immiscible organic solvent selected from the group consisting of methyl isobutyl ketone and (lower)alkyl acetates at a temperature in the range of about 0 to 35° C., separating the rich organic solvent phase containing said penicillin and recovering said penicillin therefrom.

5. A process for the production of α-phenoxyethylpenicillin which comprises mixing 6-aminopenicillanic acid with about 1.1 to 4.5 equivalents of α-phenoxypropionic acid chloride at about pH 2 in an aqueous reaction medium comprising an unstable emulsion of water and a water-immiscible organic solvent selected from the group consisting of methyl isobutyl ketone and (lower)alkyl acetates at a temperature in the range of about 0 to 35° C., separating the rich organic solvent phase containing said penicillin and recovering said penicillin therefrom.

6. A process for the production of a penicillin selected from the group consisting of an acid having the formula

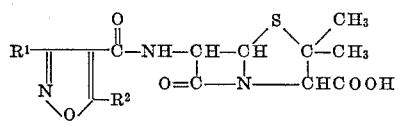

wherein $R^1$ and $R^2$ are each members selected from the group consisting of (lower)alkyl, (lower)alkylthio, benzylthio, cyclohexyl, cyclopentyl, cycloheptyl, benzyl, styryl, phenylethyl, phenylpropyl, furyl, thienyl, naphthyl and a member selected from the group consisting of a radical having the formula

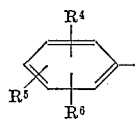

wherein $R^4$, $R^5$ and $R^6$ are each members selected from the group consisting of hydrogen, fluoro, chloro, bromo, iodo, trifluoromethyl, (lower)alkyl, (lower)alkoxy, nitro, methylsulfonyl, cyano, di(lower)alkylamino and methylmercapto which comprises mixing 6-aminopenicillanic acid with at least one equivalent of an acid chloride having the formula

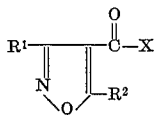

wherein $R^1$ and $R^2$ have the meaning set forth above and X is a member selected from the group consisting of chloro, bromo and iodo, at a highly acidic pH in the range of pH 2 to 4 in an aqueous reaction medium comprising an unstable emulsion of water and a water-immiscible, inert organic solvent at a temperature in the range of about 10 to 50° C., separating the rich organic solvent phase containing said penicillin and recovering said penicillin therefrom.

7. A process for the production of a penicillin selected from the group consisting of an acid having the formula

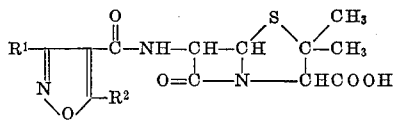

wherein $R^1$ and $R^2$ are each members selected from the group consisting of (lower)alkyl, (lower)alkylthio, benzylthio, cyclohexyl, cyclopentyl, cycloheptyl, benzyl, styryl, phenylethyl, phenylpropyl, furyl, thienyl, naphthyl and a member selected from the group consisting of a radical having the formula

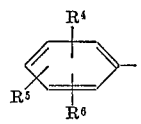

wherein $R^4$, $R^5$ and $R^6$ are each members selected from the group consisting of hydrogen, fluoro, chloro, bromo, iodo, trifluoromethyl, (lower)alkyl, (lower)alkoxy, nitro, methylsulfonyl, cyano, di(lower)alkylamino and methylmercapto which comprises mixing 6-aminopenicillanic acid with about 0.9 to 2.0 equivalents of an acid chloride having the formula

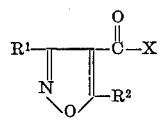

wherein $R^1$ and $R^2$ have the meaning set forth above and X is a member selected from the group consisting of chloro, bromo and iodo, at about pH 2–3 in an aqueous reaction medium comprising an unstable emulsion of water and a water-immiscible organic solvent selected from the group consisting of aliphatic esters and ketones at a temperature in the range of about 20 to 35° C., separating the rich organic solvent phase containing said penicillin and recovering said penicillin therefrom.

8. A process for the production of 2-biphenylylpenicillin which comprises mixing 6-aminopenicillanic acid with about 0.9 to 2.0 equivalents of 2-biphenylcarbonyl chloride at about pH 2 in an aqueous reaction medium comprising an unstable emulsion of water and a water-immiscible organic solvent selected from the group consisting of methyl isobutyl ketone and (lower)alkyl acetates at a temperature in the range of about 25–35° C., separating the rich organic solvent phase containing said penicillin and recovering said penicillin therefrom.

References Cited by the Examiner

UNITED STATES PATENTS

| | | | |
|---|---|---|---|
| 3,093,633 | 6/1963 | Hobbs | 260—239.1 |
| 3,132,136 | 5/1964 | Doyle et al. | 260—239.1 |
| 3,142,673 | 7/1964 | Hobbs | 260—239.1 |

ALEX MAZEL, *Primary Examiner.*

JAMES W. ADAMS, JR., *Assistant Examiner.*

Disclaimer 3,278,524.—*David A. Johnson*, Fayetteville, and *Elwin J. Richardson, Jr.*, Kirkville, N.Y. PENICILLINS AND THEIR PRODUCTION. Patent dated Oct. 11, 1966. Disclaimer filed Apr. 13, 1970, by the assignee, *Beecham Group Limited.*

Hereby enters this disclaimer to claims 1, 2, 3, 4 and 5 of said patent.

[*Official Gazette August 18, 1970.*]